United States Patent
Lwowski et al.

(10) Patent No.: US 11,526,959 B2
(45) Date of Patent: Dec. 13, 2022

(54) SYSTEM AND METHOD FOR DIGITAL IMAGE STEGANOGRAPHY DETECTION USING AN ENSEMBLE OF NEURAL SPATIAL RICH MODELS

(71) Applicant: Booz Allen Hamilton Inc., McLean, VA (US)

(72) Inventors: Jonathan Richard Lwowski, San Antonio, TX (US); Isaac Alexander Corley, San Antonio, TX (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 218 days.

(21) Appl. No.: 17/098,037

(22) Filed: Nov. 13, 2020

(65) Prior Publication Data

US 2021/0150312 A1 May 20, 2021

Related U.S. Application Data

(60) Provisional application No. 62/936,075, filed on Nov. 15, 2019.

(51) Int. Cl.
*G06T 1/00* (2006.01)
*G06K 9/62* (2022.01)
*G06F 17/18* (2006.01)

(52) U.S. Cl.
CPC .......... *G06T 1/0021* (2013.01); *G06K 9/6267* (2013.01); *G06F 17/18* (2013.01)

(58) Field of Classification Search
CPC .......... G06T 1/0021; G06T 2201/0065; G06T 2201/0202; G06T 1/005; G06K 9/6267;

(Continued)

(56) References Cited

U.S. PATENT DOCUMENTS

2019/0259126 A1* 8/2019 Lancioni .............. G06V 10/454

OTHER PUBLICATIONS

Holub, V. et al., "Designing steganographic distortion using directional filters" in 2012 IEEE International workshop on information forensics and security (WIFS). IEEE, 2012, pp. 234-239, Abstract Only.

(Continued)

*Primary Examiner* — Christopher Wait
(74) *Attorney, Agent, or Firm* — Buchanan Ingersoll & Rooney PC (57) ABSTRACT

Exemplary systems and methods are disclosed for detecting embedded data in a digital image. The system includes a processing device that extracts one or more features from a digital image and analyzes the one or more extracted features in a plurality of steganography analyzers, each steganography analyzer configured to execute a different steganography algorithm. The processing device generates an output data value at each steganography analyzer, the output data value indicating a probability that the digital image includes steganography according to the steganography algorithm of the steganography analyzer. Each output probability value is fed to an ensemble classifier, the ensemble classifier including a neural network in which the output probability values of the plurality of steganography analyzers are ensembled together to generate an output ensemble data value indicating a probability that the digital image includes any steganography according to the steganography algorithms of the steganography analyzers.

19 Claims, 9 Drawing Sheets

(58) Field of Classification Search
CPC .... G06K 9/6292; G06F 17/18; G06N 3/0472; G06N 3/0454; G06N 3/08; G06V 10/454; G06V 10/764; G06V 10/774; G06V 10/809; G06V 10/82
See application file for complete search history.

(56) References Cited

OTHER PUBLICATIONS

Li, B. et al., "A new cost function for spatial image steganography" in 2014 IEEE International Conference on Image Processing (ICIP). IEEE, 2014, pp. 4206-4210.

* cited by examiner

SYSTEM AND METHOD FOR DIGITAL IMAGE STEGANOGRAPHY DETECTION USING AN ENSEMBLE OF NEURAL SPATIAL RICH MODELS

FIELD

The present disclosure is related to methods and systems for detecting embedded data in a digital image.

BACKGROUND

Steganography comprises various techniques of concealing data or information within other exposed or visible data or information used as a host. Digital image steganography involves having hidden text or data within a host image. Steganography increasingly poses a threat to the security of computer systems and networks. Bad actors can embed malicious payloads including program code, a shellcode, or scripts into an image, which is transmitted to a computer system or computing network. Once the image is downloaded to the computer system or network, the payload can be executed to control or exploit system or network operation. Existing steganography detection systems perform adequately in detecting classic stenography algorithms. These same detection systems, however, perform poorly when tasked with detecting modern steganography algorithms. Existing detection systems provide techniques for performing stenography detection for a plurality of steganography algorithms by performing each detection operation in isolation and averaging together the results of the detection algorithms.

Known steganalysis algorithims incorporate neural networks as the classification backbone for detecting modern steganography algorithms. For example, [1] Kodovsky, Jan & Fridrich, Jessica. (2012). Steganalysis of JPEG Images Using Rich Models. Proceedings of SPIE—The International Society for Optical Engineering. 8303. 7-. 10.1117/12.90749; [2] Kodovsky, Jan & Fridrich, Jessica & Holub, Vojtech. (2012). *Ensemble Classifiers for Steganalysis of Digital Media*. IEEE Transactions on Information Forensics and Security. 7. 10.1109/TIFS.2011.2175919; and [3] Fridrich, Jessica & Kodovsky, Jan. (2012). *Rich Models for Steganalysis of Digital Images*. IEEE Transactions on Information Forensics and Security. 7. 868-882. 10.1109/TIFS.2012.2190402, each describe machine learning methods for steganalysis that consist of ensemble classifiers of algorithms such as Support Vector Machines and Random Forests which take input features extracted using methods such as Spatial Rich Models (SRM), maxSRM as described by [4] Tomas Denemark, Vahid Sedighi, Vojtech Holub, R'emi Cogranne, and Jessica Fridrich, entitled *Selection-channel-aware rich model for steganalysis of digital images*. In 2014 IEEE International Workshop on Information Forensics and Security (WIFS), pages 48-53. IEEE, 2014; and CFAaware CRM as described by [5] Miroslav Goljan and Jessica Fridrich. *Cfa-aware features for steganalysis of color images*. In Media Watermarking, Security, and Forensics 2015, volume 9409, page 94090V. International Society for Optics and Photonics, 2015. Other known methods of feature extraction are used as well.

Many known steganalysis techniques use Deep Neural Networks (DNN) to identify the existence of steganography in pixels. For example, [6] Xiaoyu Xu, Yifeng Sun, Guangming Tang, Shiyuan Chen, and Jian Zhao. *Deep learning on spatial rich model for steganalysis*. In International Workshop on Digital Watermarking, pages 564-577. Springer, 2016 describes a DNN designed for feature extraction at the pixel level. Furthermore, and as described by: [7] Mehdi Boroumand, Mo Chen, and Jessica Fridrich. *Deep residual network for steganalysis of digital images*. IEEE Transactions on Information Forensics and Security, 14(5):1181-1193, 2018; [8] Songtao Wu, Shenghua Zhong, and Yan Liu. *Deep residual learning for image steganalysis. Multimedia tools and applications*, 77(9):10437-10453, 2018; (9) Yinlong Qian, Jing Dong, Wei Wang, and Tieniu Tan. *Deep learning for steganalysis via convolutional neural networks*. In Media Watermarking, Security, and Forensics 2015, volume 9409, page 94090J. International Society for Optics and Photonics, 2015; and [9] Guanshuo Xu. *Deep convolutional neural network to detect j-uniward*. In Proceedings of the 5th ACM Workshop on Information Hiding and Multimedia Security, pages 67-73. ACM, 2017, convolutional Neural Networks (CNN) are used on raw images to identify steganography in pixels. The entire content of each publication cited both supra and infra are hereby incorporated by reference in their entirety.

SUMMARY

An exemplary system for detecting embedded data in a digital image is disclosed, the system comprising: a receiving device configured to receive a digital image; at least one processing device configured to: feed the digital image to two or more steganography analyzers of the at least one processing device, the two or more steganography analyzers being configured to execute different steganography algorithms; extract, in each of the two or more steganography detectors, one or more features from the digital image; analyze, in each steganography analyzer, the one or more extracted features according to the steganography algorithm being executed, the analysis generating a data value indicating a probability that the one or more extracted features is encoded with steganography according to the executed steganography algorithm; feed the data values generated by each steganography analyzer to an ensemble classifier of the at least one processing device, the ensemble classifier including a plurality of nodes and node connections based on a combination of one or more nodes and node connections between pairs of nodes of the two or more steganography analyzers; analyze, via the ensemble classifier, the data values of each steganography analyzer; and generate, via the ensemble classifier and for each digital image associated with the probability values, an output indicating the probability that the subject image includes steganography according to any of the different steganography algorithms.

An exemplary method of training a system for detecting data embedded in a digital image is disclosed, wherein the system includes a receiving device and at least one processing device, the method comprising: receiving via the receiving device, a plurality of digital image datasets including a first digital image dataset and a second digital image dataset, the first digital image dataset including a plurality of reference digital images that are free of steganography and the second digital image dataset including steganography digital images based on the plurality of reference digital images, each steganography digital image being encoded according to one of a plurality of steganography algorithms; iteratively feeding pairs of images where each pair consists of one image from the first digital image dataset and one image from the second digital image dataset to two or more steganography analyzers of the at least one processing device; adjusting, in each steganography analyzer, weights of at least one of one or more nodes and one or more connections between one or more pairs of nodes according to image pairs of the plurality of images, each image pair including a reference image and a steganography image based on the reference image; freezing the weights of each steganography analyzer; iteratively feeding pairs of images where each pair consists of one image from the first digital image dataset and one image from the second digital image datasets to two or more steganography analyzers of the at least one processing device; combining, in the ensemble classifier, the output probabilities of each steganography analyzer; and adjusting, in the ensemble classifier, a second set of weights of at least one of one or more nodes and one or more connections between one or more pairs of nodes according to the errors generated by the ensemble classifier for each iteration of pairs of images.

An exemplary method for detecting embedded data in a digital image using a system, which includes a receiving device and at least one processing device having two or more steganography analyzers wherein each steganography analyzer is configured to perform steganography analysis according to a different steganography algorithm from the other one or more of the two or more steganography analyzers, the method comprising: receiving one or more digital images via the receiving device; extracting, in each of the two or more steganography analyzers, one or more features from each digital image; feeding the extracted features to the two or more steganography analyzers of the at least one processing device and analyzing the extracted features by executing in each steganography analyzer the corresponding steganography algorithm; generating, for each digital image at an output of each steganography analyzer, an output data value indicating a probability that the digital image includes steganography according to the steganography algorithm executed by the steganography analyzer; feeding the output data value of each steganography analyzer to an ensemble classifier of the at least one processing device, the ensemble classifier including a plurality of nodes and node connections based on a combination of one or more nodes and/or node connections between pairs of nodes of the two or more steganography analyzers; analyzing, via the ensemble classifier, the output data value from each steganography analyzer; and generating, via the ensemble classifier, an ensemble output indicating the probability that the digital image includes any steganography of the steganography algorithms executed by the two or more steganography analyzers.

An exemplary apparatus for detecting embedded data in one or more digital images is disclosed, the apparatus comprising: at least one processing device configured to: extract one or more features from each digital image; analyze the one or more extracted features in two steganography analyzers, each steganography analyzer configured to execute a different steganography algorithm; generate a data value at each steganography analyzer, the data value indicating a probability that the one or more extracted features includes steganography according to the steganography algorithm of the steganography analyzer; feed each data value to an ensemble classifier, the ensemble classifier including a plurality of nodes and node connections based on a combination of one or more nodes and/or node connections between pairs of nodes of the two or more steganography analyzers; and generate an ensemble output indicating the probability that the digital image associated with the one or more extracted features includes any steganography according to the steganography algorithms of the steganography analyzers.

BRIEF DESCRIPTION OF THE DRAWINGS

Exemplary embodiments are best understood from the following detailed description when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

Exemplary embodiments of the present disclosure are directed to methods and systems for steganography detection in a digital image. One or more processors or processing devices encoded with program code for performing steganalysis are configured to extract features from an image using spatial rich models. The one or more processing devices can be encoded with a deep neural network for performing image steganalysis across a plurality of steganography algorithms and embedding rates, to determine a probability that steganography is present in a digital image.

Figure 1:
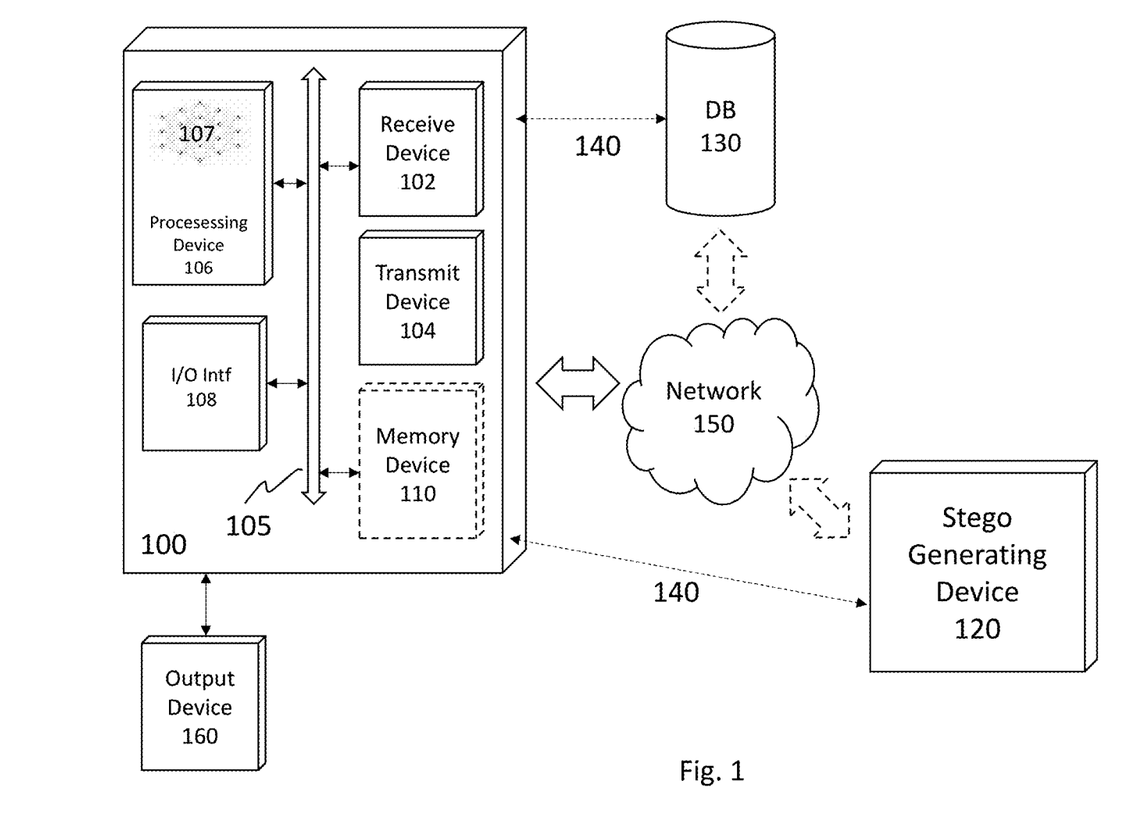
FIG. 1 illustrates a steganography detection device in accordance with an exemplary embodiment of the present disclosure.

FIG. 1 illustrates a steganography detection system in accordance with an exemplary embodiment of the present disclosure.

As shown in FIG. 1, the steganography detection system 100 can include steganography detection device 101. The steganography detection device includes a receiving device 102, a transmitting device 104, one or more processing devices 106, an Input/Output (I/O) interface 108, and memory device 110. The receiving device 102 can include a combination of hardware and software components and be configured to receive one or more digital images from a remote computing device, such as a steganography generating device 120 or image database 130 via a peer-to-peer connection 140 or through a network 150. The steganography generating device 120 or image database 130 are configured to generate data signals and/or data packets encoded with steganographic digital images. The peer-to-peer connection 140 can be configured for wireless communication without an intermediate device or access point. The network 150 can be configured for wired or wireless communication, which may include a local area network (LAN), a wide area network (WAN), a wireless network (e.g., Wi-Fi), a mobile communication network, a satellite network, the Internet, fiber optic cable, coaxial cable, infrared, radio frequency (RF), another suitable communication medium as desired, or any combination thereof.

The receiving device 102 can include a hardware component such as an antenna, a network interface (e.g., an Ethernet card), a communications port, a PCMCIA slot and card, or any other suitable component or device as desired for effecting communication with the remote computing device/steganography generating device 120, image database 130 and/or the network 150. The receiving device 102 can be encoded with software or program code for receiving image data according to one or more communication protocols and data formats. The receiving device 102 can be configured to process and/or format the received data signals and/or data packets which include images for steganalysis. For example, the receiving device 102 can be configured to identify parts of the received data via a header and parse the data signal and/or data packet into small frames (e.g., bytes, words) or segments for further processing in the one or more processing devices 106. The receiving device 102 can be configured to feed the received one or more digital images to the at least one processing device 106.

The steganography detection device 101 can also include at least one processing device 106 encoded with a neural network architecture to perform a steganography analysis on the one or more digital images received by the receiving device 102. According to exemplary embodiments of the present disclosure, the processing device 106 can include a hardware processor as a special purpose or a general purpose processing device encoded with program code or software for performing the exemplary functions and/or features disclosed herein. The processing device 106 can be connected to a communications infrastructure 105 including a bus, message queue, network, or multi-core message-passing scheme, for communicating with other components of the computing device 100, such as the receiving device 102, the transmitting device 104, and an I/O interface 108. The processing device 106 can include one or more hardware processors such as a microprocessor, central processing unit, microcomputer, programmable logic unit, or any other suitable processing device(s) as desired.

Figure 2:
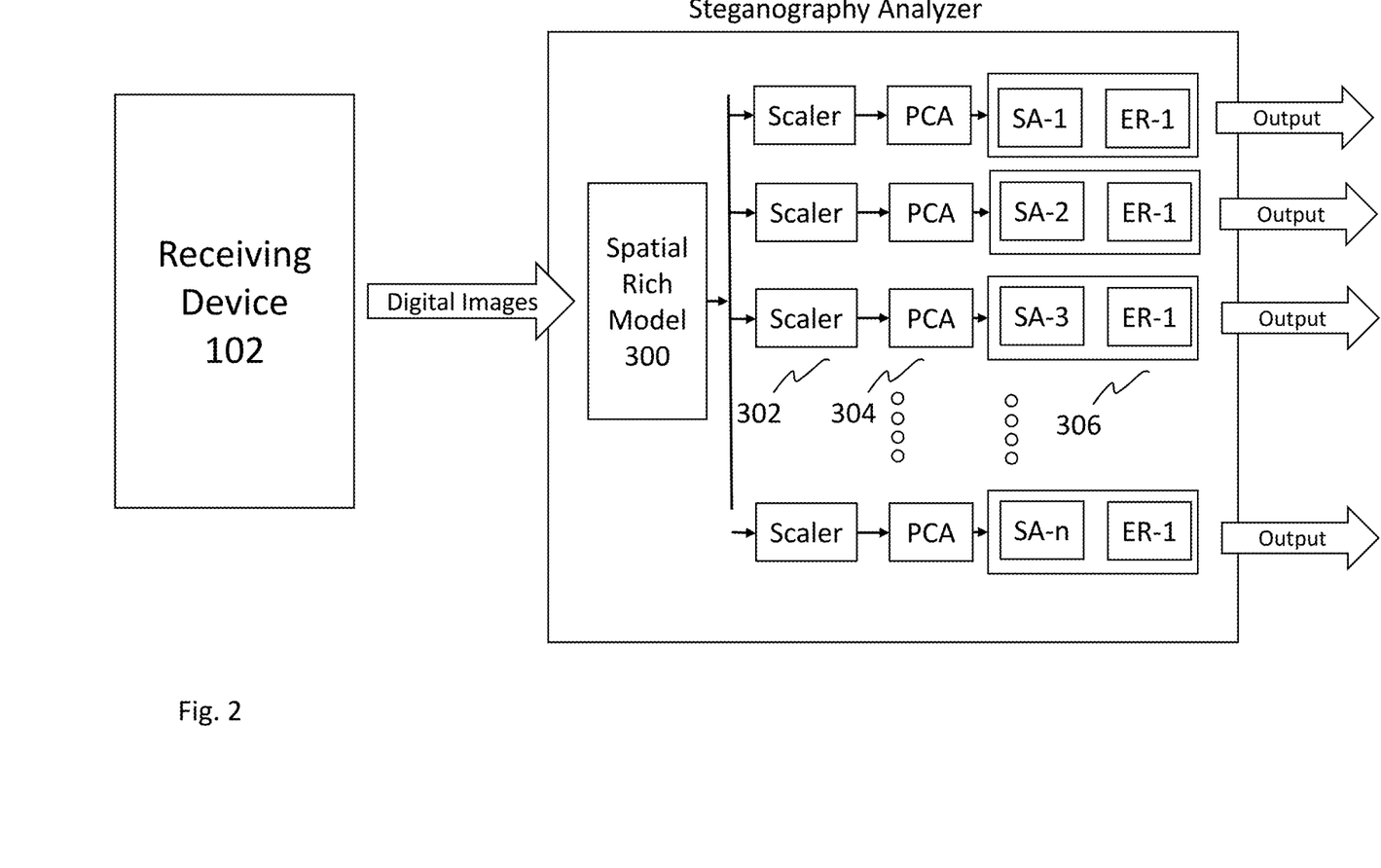
FIG. 2 illustrates a steganography analyzer of the steganography detection device in accordance with an exemplary embodiment of the present disclosure.

FIG. 2 illustrates a steganography analyzer of the steganography detection device in accordance with an exemplary embodiment of the present disclosure.

According to an exemplary embodiment of the present disclosure, the processing device 106 can be encoded with a software program or program code to implement electronic circuitry and/or a neural network architecture 107 for performing steganalysis on digital images received by the receiving device 102. As shown in FIG. 2, the neural network architecture can include a plurality of steganography analyzers (SA-1 to SA-n) for determining whether data is embedded in digital images received from one or more remote computing devices/steganography generating devices 120 or image databases 130. The digital images received by the receiving device 102 can be fed to each of the plurality of steganography analyzers (SA-1 to SA-n) in parallel. Each steganography analyzer SA-n can be configured to extract one or more features from each digital image.

According to an exemplary embodiment, the steganography analyzers SA-1 to SA-n can be configured to use spatial rich models (SRM), maxSRM, color filter array (CFA), aware color rich model (CRM), or any other suitable algorithm as desired to extract features from the digital images. In performing feature extractions, the at least one processing device 106 can be configured to evaluate noise residuals in neighboring pixels to identify pixels which have steganographic embedded data. The noise residuals contain the high frequency components of an image and the residuals (R) can be computed as follows:

$$R_{i,j} = \hat{X}_{i,j}(N_{i,j}) - X_{i,j} \quad (1)$$

Where $N_{i,j}$ is the local neighborhood of pixel $X_{i,j}$, and $\hat{X}_{i,j}(N_{i,j})$ is the predictor for the subject pixel. The residuals (R) are quantized and truncated as follows:

$$R_{i,j} \leftarrow trunc_T\left(\text{round}\left(\frac{R_{i,j}}{q}\right)\right) \quad (2)$$

Where q>0 is the quantization step, and T is the truncation threshold. The processing device 106 generates (e.g., compute) an output vector composed of a plurality of residuals, which are used as features in the steganography analysis. According to an exemplary embodiment, the processing device 106 is configured to generate an output vector of a size p for an image of any size, format, color space, or content.

Each steganography analyzer SA-n can be configured to analyze the one or more extracted features via execution of a different steganography algorithm in at least one other steganography analyzer SA-x (where 0<x<n). For example, the different steganography algorithms can include, for example, Highly Undetectable Steganography (HUGO) as described in [10] Tomáš Pevný, Tomáš Filler, and Patrick Bas. *Using high dimensional image models to perform highly undetectable steganography*. In International Workshop on Information Hiding, pages 161-177. Springer, 201, steganography utilizing a universal distortion function (S-UNIWARD) as described in [11] Vojtěch Holub, Jessica Fridrich, and Tomáš Denemark. *Universal distortion function for steganography in an arbitrary domain*. EURASIP Journal on Information Security, 2014(1):1, 2014, steganography based on a hill cipher technique (HILL) as described in Bin Li, Ming Wang, Jiwu Huang, and Xiaolong Li. *A new cost function for spatial image steganography*. In 2014 IEEE International Conference on Image Processing (ICIP), pages 4206-4210. IEEE, 2014, steganography based on wavelet obtained weights (WOW) as described in [12] Vojtěch Holub and Jessica Fridrich. *Designing steganographic distortion using directional filters*. In 2012 IEEE International workshop on information forensics and security (WIFS), pages 234-239. IEEE, 2012, or any other suitable steganography algorithm as desired. According to an exemplary embodiment, steganography detection device 101 can include a plurality of steganography analyzers SA-1 to SA-n where at least two steganography analyzers SA-x and SA-y (where x≠y and 0<x≤n and 0<y≤n) are configured to execute different steganography algorithms. The analysis performed by each steganography analyzer (SA-1 to SA-n) generates a data value indicating a probability that a digital image being analyzed is encoded with stenography according to the steganography algorithm executed by the steganography analyzer.

Each steganography analyzer SA-v (where 0<v≤n) can be configured to analyze the digital images according to one or more embedding rates. The embedding rate defines the percentage of the image that includes embedded data. According to an exemplary embodiment, the one or more of the steganography analyzers is configured to detect data embedded within a spectrum ($\chi$) of embedding rates, where 100%≥$\chi$>0%. The spectrum of embedding rates being defined from a training image dataset. For example, an embedding rate of 25% indicates that a quarter of the total number of pixels in the image are encoded with steganography (i.e., include embedded data). The value of the embedding rate has an inverse relationship (e.g., negative correlation) to the difficulty with which the embedded image can be detected.

Figure 3:
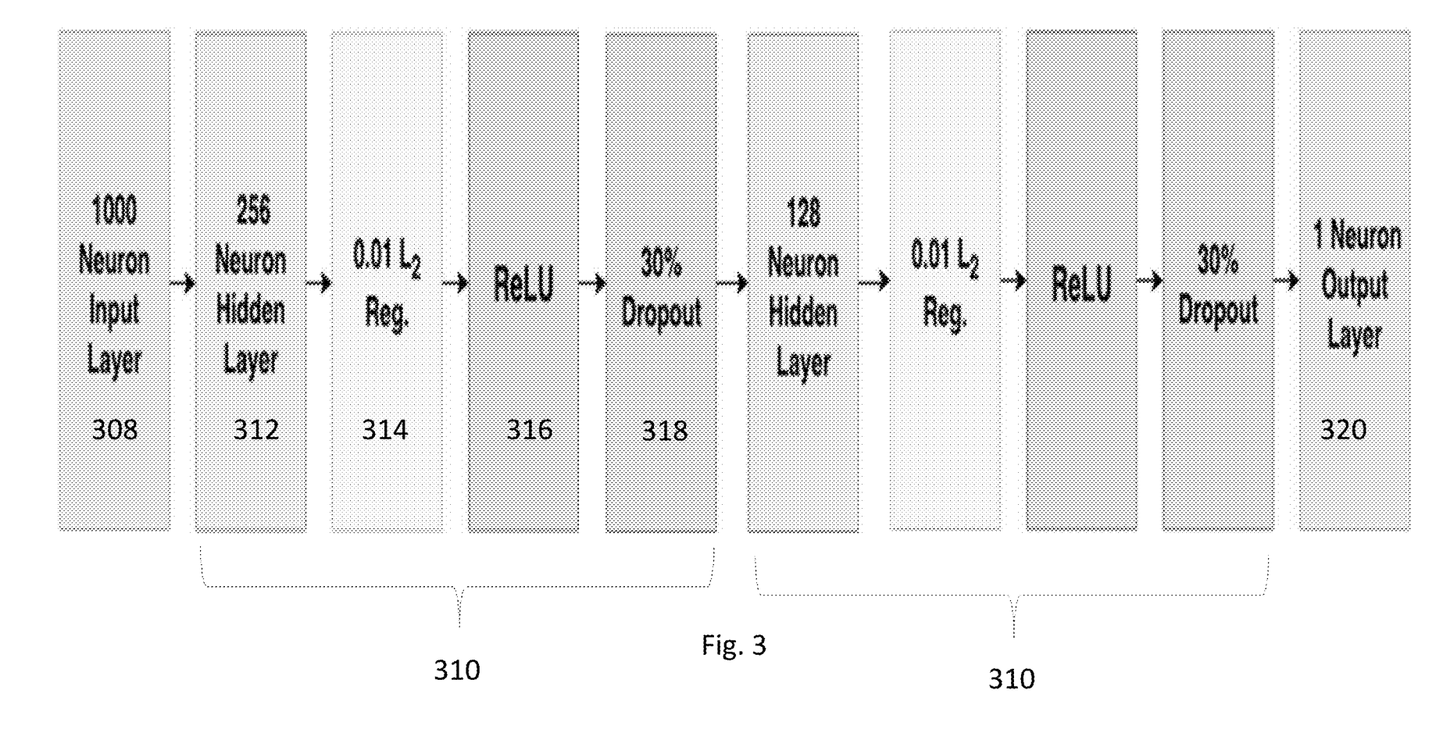
FIG. 3 illustrates a neural network of the steganography analyzer in accordance with an exemplary embodiment of the present disclosure.

FIG. 3 illustrates a neural network of the steganography analyzer in accordance with an exemplary embodiment of the present disclosure.

As shown in FIG. 3, each steganography analyzer (SA-1 to SA-n) is configured to include an SRM 300 that performs feature extraction as described with respect to FIG. 2. The extracted features are scaled (e.g., normalized) 302 to have zero mean and unit variance. Following normalization, a Principal Component Analysis (PCA) 304 as described in [13] Ian Jolliffe. *Principal component analysis*. Springer, 2011, is performed on the image data to reduce the extracted features from p principal components included in the output vector to m principal components. According to an exemplary embodiment, the feature extraction can be performed to extract p=37,561 features from a received image and the PCA 304 can reduce the number of components to m=1000. The m principal components can be input to a deep neural network (DNN) 306, which performs the analysis according to a specified steganography algorithm of the steganography analyzer SA-v (0<v≤n). The DNN 306 is configured to have an input layer 308 which includes a plurality of nodes equal to the m principal components, a plurality of intermediate layers 310 configured as at least one hidden layer, which includes a plurality of neurons 312, 12 regularization 314 to reduce overfitting, Rectified Linear Unit (ReLU) activation 316 as described in [14] Kevin Jarrett, Koray Kavukcuoglu, Marc'Aurelio Ranzato, and Yann LeCun. *What is the best multi-stage architecture for object recognition?* In 2009 IEEE 12th international conference on computer vision, pages 2146-2153. IEEE, 2009, which defines the output of the neuron given its inputs, and 30% dropout of randomly selected neurons 316 as described in [15] Nitish Srivastava, Geoffrey Hinton, Alex Krizhevsky, Ilya Sutskever, and Ruslan Salakhutdinov. *Dropout: a simple way to prevent neural networks from overfitting*. The journal of machine learning research, 15(1):1929-1958, 2014. The DNN 306 also includes an output layer 318, which includes at least one neuron with sigmoid activation, and generates a probability that an analyzed image contains steganography according to the specified steganography algorithm.

Figure 4:
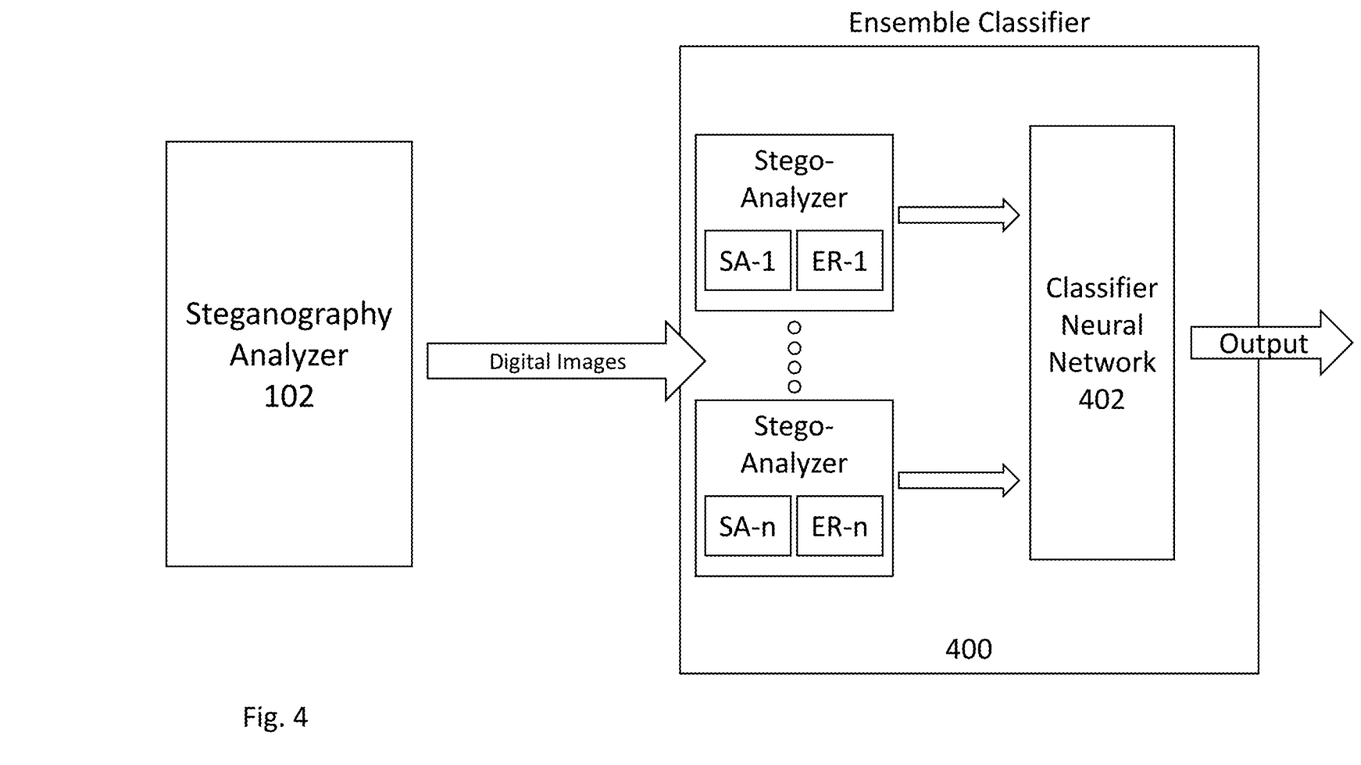
FIG. 4 illustrates an ensemble classifier of the steganography detection device in accordance with an exemplary embodiment of the present disclosure.

FIG. 4 illustrates an ensemble classifier of the steganography detection device in accordance with an exemplary embodiment of the present disclosure.

As shown in FIG. 4, the processing device 106 can be encoded to include an ensemble classifier 400. Each steganography analyzer SA-k (0<k≤n) can be connected to feed its output, which indicates the probability that the image contains steganography of the steganography algorithm corresponding to that steganography analyzer, to the ensemble classifier 400. The ensemble classifier 400 includes a plurality of nodes and node connections from each of the plurality of steganography analyzers SA-1 to SA-n. Training of the ensemble classifier results in the plurality of nodes and node connections between pairs of nodes of each steganography analyzer being combined or ensemble according to corresponding nodes and/or layers of the steganography analyzers SA-1 to SA-n. That is, one or more nodes and/or node connections of the ensemble classifier is weighted and/or established based on node weights and/or properties in each of the plurality of steganography analyzers (SA-1 to SA-n). As a result, the ensemble classifier can perform steganography detection on a digital image according to the different steganography algorithms executed by the plurality of steganography analyzers. According to an exemplary embodiment, the ensemble classifier 400 can be composed of an ensemble of at least two steganography analyzers SA-x and SA-y (where x≠y and 0<x≤n and 0<y≤n) configured to execute different steganography algorithms. The ensemble classifier 400 can be configured to generate an output value indicating whether an at least one specified image of one or more digital images is encoded with data according to a steganography algorithm executed by any one of the two or more steganography analyzers SA-x and SA-y.

Figure 5:
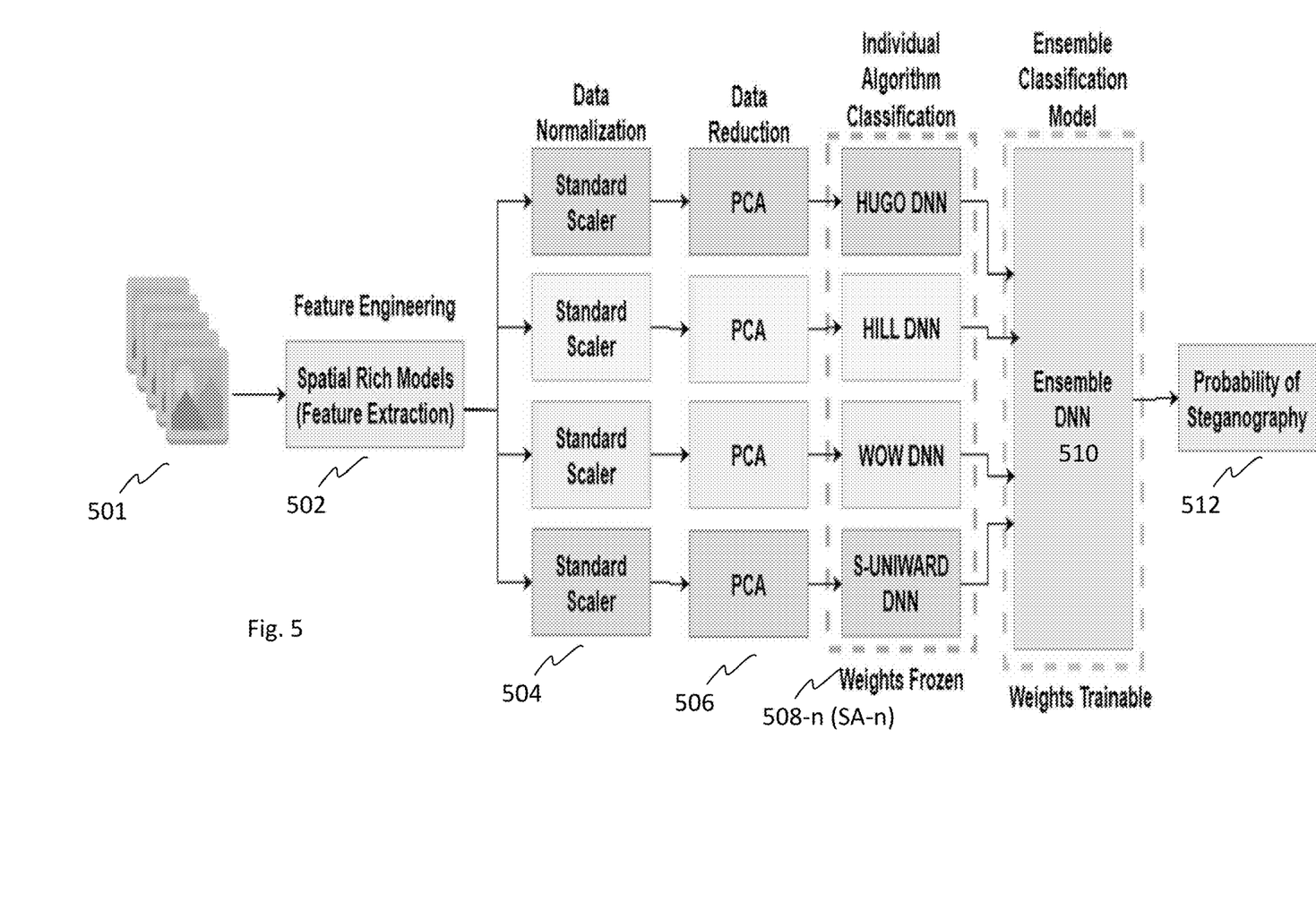
FIG. 5 illustrates a flow diagram of an ensemble classifier in accordance with an exemplary embodiment of the present disclosure.

FIG. 5 illustrates a flow diagram of an ensemble classifier in accordance with an exemplary embodiment of the present disclosure.

As shown in FIG. 5, the ensemble classifier 400 can be configured to receive a plurality of digital images 501. The digital images 501 can be input to one or more spatial rich models 502 for extracting principal component features p of input images, a normalization model 504 for scaling the extracted features, and a PCA 506 for reducing the number of principal components from p to m. It should be understood that the spatial rich model 502, the normalization model 504, and the PCA 506 perform the same operations as discussed above with respect to the corresponding components of FIG. 3. For each input neuron 500-x (where 0<x≤n), the principal components m are fed to corresponding individual DNNs 508-x according to the steganography algorithm executed by the associated steganography analyzer SA-x. To increase the accuracy of the steganography detection in the ensemble classifier 400, the individual weights of the various nodes in each of the steganography analyzers SA-x are frozen. The output of each individual DNN 508-x is fed to another DNN 510 which is configured to ensemble together the different steganography algorithms performed by the individual DNNs 508-x. That is, the weights of plural nodes in each individual DNN 508-x are combined (e.g., synthesized) with the weights of other individual DNNs 508-y to establish the plural layers of nodes in the DNN 510. The weights of the DNN 510, which are based on the weights of the steganography analyzers 508-n, are adjustable. Having the weights of the individual DNNs 508-x frozen and the weights of the DNN 510 adjustable allows for greater precision and fine-tuning of the steganography detection in an image. The DNN 510 outputs a probability 512 that the image(s) being analyzed contain steganography.

Figure 6:
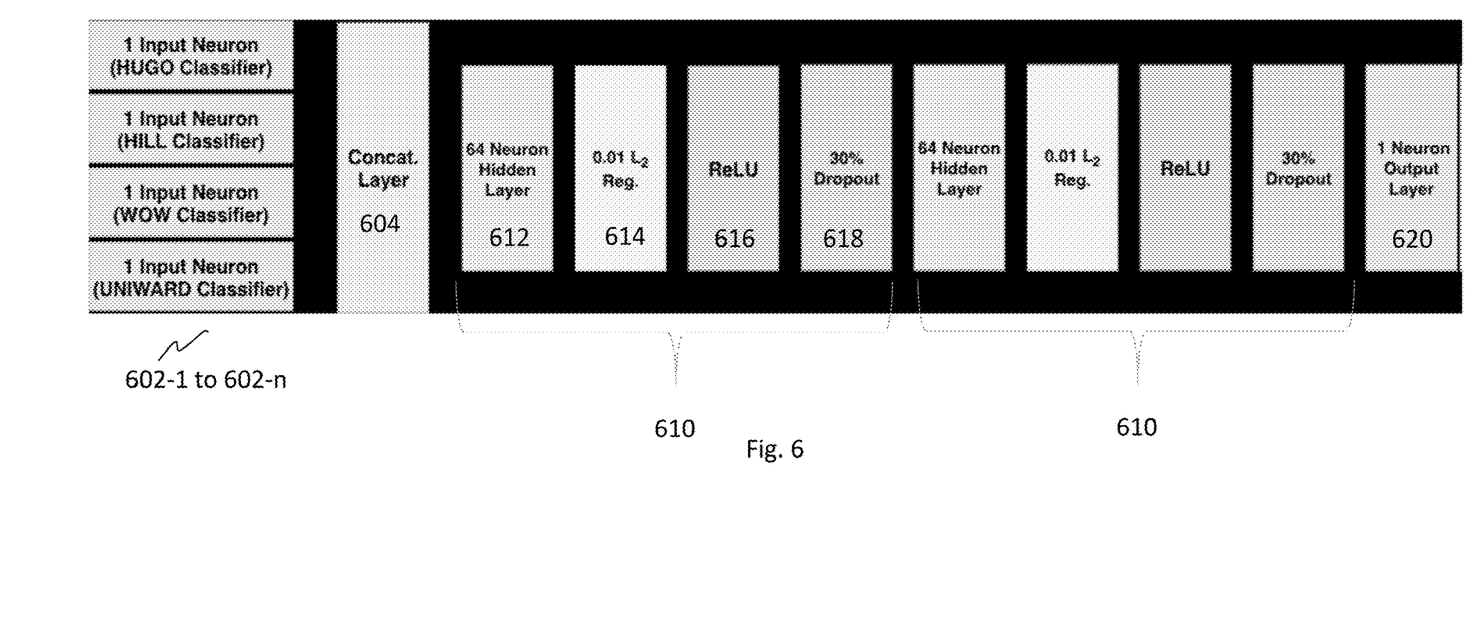
FIG. 6 illustrates a neural network of an ensemble classifier in accordance with an exemplary embodiment of the present disclosure.

FIG. 6 illustrates a neural network of an ensemble classifier in accordance with an exemplary embodiment of the present disclosure. As shown in FIG. 6, the neural network 600 of the ensemble classifier 400 includes four inputs 602-1 to 602-4. Each input 602-1 to 602-4 includes one neuron which is the probability of the image having steganography according to the specified steganography algorithm executed by the corresponding steganography analyzer of SA-1 to SA-n. A concatenation layer 604 is connected to receive each input neuron 602-1 to 602-4, and combines the separate inputs into a single layer. A plurality of intermediate layers 610 are configured to include at least one hidden layer 612.

The hidden layer 612 includes a specified number r of neurons 612, $l_2$ regularization 614, ReLU activations 616, and 30% dropout 618. According to an exemplary embodiment, r can be equal to 64, or any other suitable number of neurons as desired, and the dropout can be set to any suitable percentage as desired. The plurality of intermediate layers includes one or more nodes and/or node connections with weights and/or properties established based on node weights and/or properties in each of the plurality of steganography analyzers SA-1 to SA-4. An output layer 620 is connected to the last intermediate layer in the sequence and includes one neuron which indicates the probability that the image contains steganography according to any one or more of the different steganography algorithms executed according to the corresponding steganography analyzers SA-1 to SA-4.

Turning back to FIG. 1, the transmitting device 104 can be configured to receive the output from the processing device 106 via the communication infrastructure 105. The output can include the probability value from the output layer 620. The transmitting device 104 can assemble the data into a data signal and/or data packets according to the specified communication protocol and data format for communication over the network 150 to another computing device. The transmitting device 104 can include any one or more of hardware and software components for generating and communicating the data signal over the network 150 and/or via a direct wired or wireless link to a peripheral or remote device. The transmitting device 104 can be configured to transmit information according to one or more communication protocols and data formats as discussed above in connection with the receiving unit 102.

According to an exemplary embodiment, the I/O interface 108 can also be configured to receive the probability data from the processing device 106 via the communication infrastructure 105. The I/O interface 108 can be configured to convert the probability data into a format suitable for output on one or more output devices 160. According to an exemplary embodiment, the output device 160 can be implemented as a display device, printer, speaker, or any suitable output format as desired.

Figure 7:
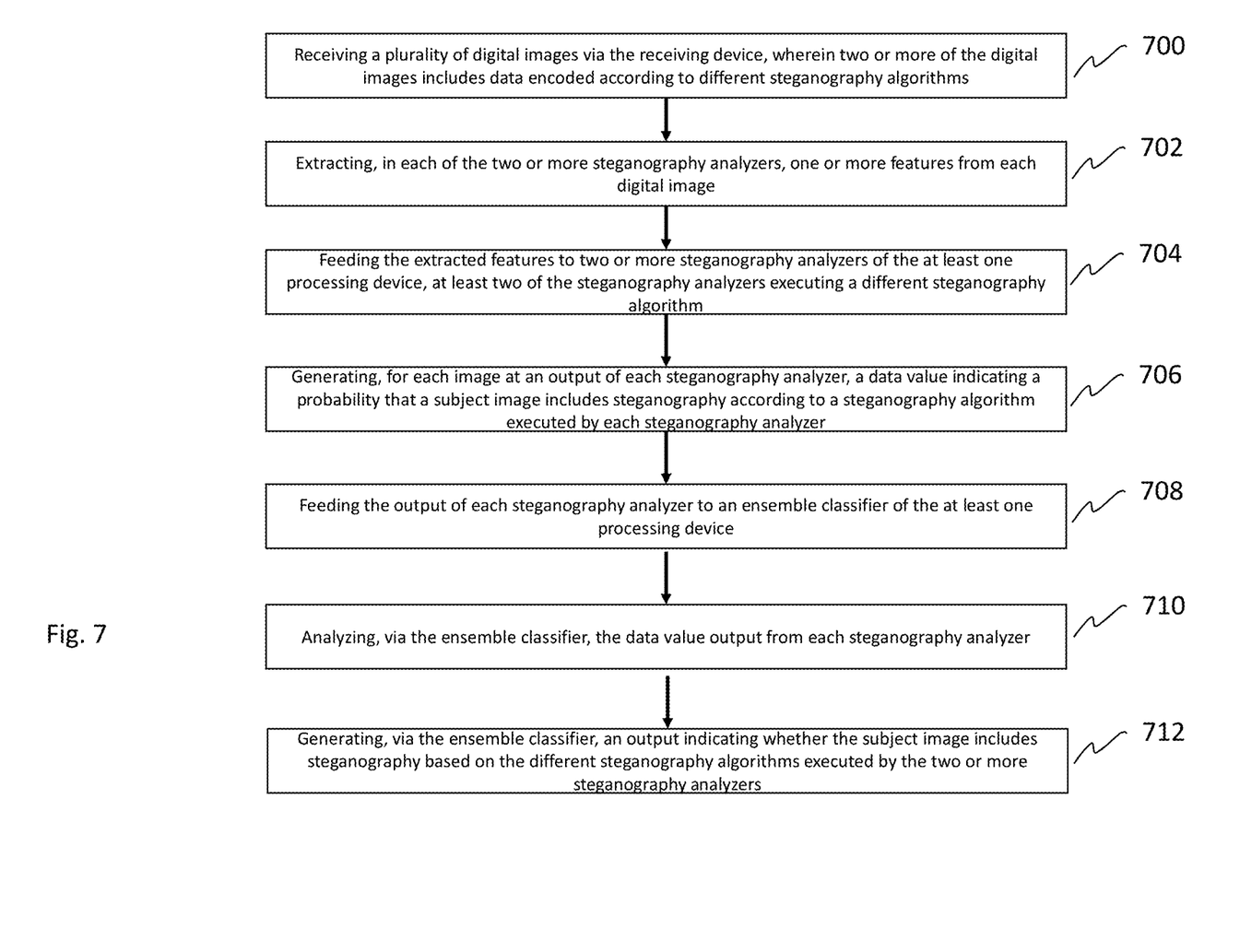
FIG. 7 illustrates a method for detecting steganography in a digital image in accordance with an exemplary embodiment of the present disclosure.

FIG. 7 illustrates a method for detecting steganography in a digital image in accordance with an exemplary embodiment of the present disclosure. The method is performed according to the steganography detection device of FIG. 1, which includes at least a receiving device 102 and the processing device 106. According to the exemplary method of FIG. 7, the receiving device 102 receives a plurality of digital images from a remote computing device/steganography generating device 120 or image database 130 (Step 700). Two or more of the received digital images are encoded according to different steganography algorithms. The plurality of received digital images are fed to two or more steganography analyzers SA-1 to SA-n of the processing device 106 (Step 702), which are configured to execute different steganography algorithms. The two or more steganography detectors SA-1 to SA-n extract features from the received digital images (Step 704). At an output of each steganography analyzer SA-x (where 0<x≤n), a data value is generated that represents a calculated probability that a received digital image includes steganography according to the steganography algorithm being executed by the steganography analyzer (Step 706). The probability value output by each steganography detector SA-x is fed to an ensemble classifier 400 of the at least one processing device 106 (Step 708). The ensemble classifier 400 can be implemented in the neural network architecture 107, which is trained to ensemble together a plurality of steganography analyzers SA-1 to SA-n, where two or more of the steganography analyzers SA-1 to SA-n execute different steganography algorithms. Based on this training, the ensemble classifier 400 analyzes the data value output from each steganography analyzer SA-1 to SA-n (Step 710), and generates an output probability that an image under analysis includes steganography according to the steganography algorithms executed by the steganography analyzers SA-1 to SA-n (Step 712).

Figure 8:
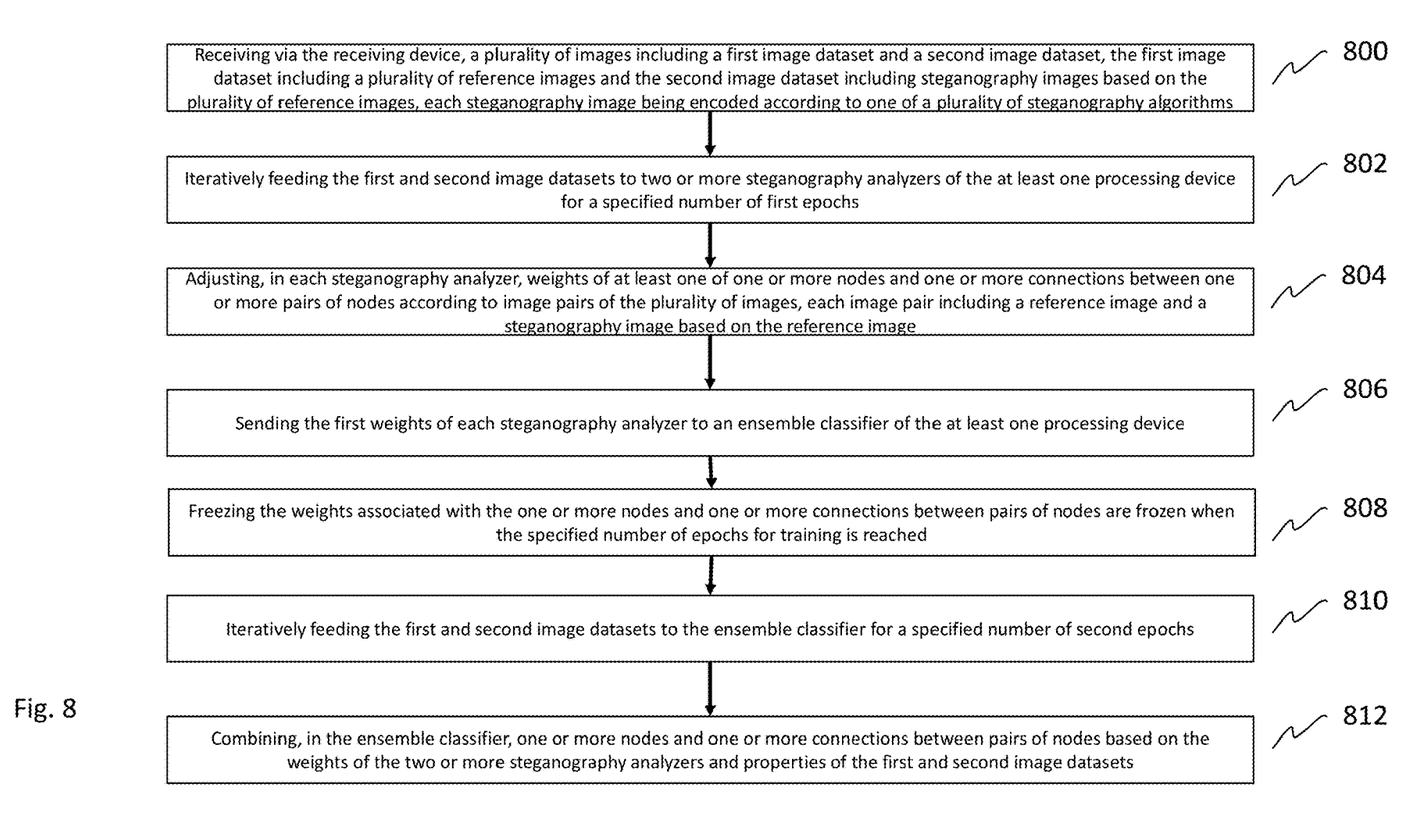
FIG. 8 illustrates a method for training an ensemble classifier in accordance with an exemplary embodiment of the present disclosure.

FIG. 8 illustrates a method for training an ensemble classifier in accordance with an exemplary embodiment of the present disclosure. An exemplary method of training a system for detecting data embedded in a digital image is disclosed, wherein the system includes a receiving device and at least one processing device, the method comprising: receiving via the receiving device, a plurality of digital image datasets including a first digital image dataset and a second digital image dataset, the first digital image dataset including a plurality of reference digital images that are free of steganography and the second digital image dataset including steganography digital images based on the plurality of reference digital images, each steganography digital image being encoded according to one of a plurality of steganography algorithms; iteratively feeding pairs of images where each pair consists of one image from the first digital image dataset and one image from the second digital image datasets to two or more steganography analyzers of the at least one processing device; adjusting, in each steganography analyzer, weights of at least one of one or more nodes and one or more connections between one or more pairs of nodes according to image pairs of the plurality of images, each image pair including a reference image and a steganography image based on the reference image; freezing the weights of each steganography analyzer; iteratively feeding pairs of images where each pair consists of one image from the first digital image dataset and one image from the second digital image datasets to two or more steganography analyzers of the at least one processing device; combining, in the ensemble classifier, the output probabilities of each steganography analyzer; and adjusting, in the ensemble classifier, a second set of weights of at least one of one or more nodes and one or more connections between one or more pairs of nodes according to the errors generated by the ensemble classifier for each iteration of pairs of images.

According to the exemplary method of FIG. 8, the receiving device 102 receives an image data set including a plurality of digital images arranged in one or more datasets (Step 800). One of the image datasets is a reference dataset including a cover image, and one or more of the other image datasets includes one or more image encoded or embedded with data according to a specified stenography algorithm at a specified embedding rate. According to an exemplary embodiment of the present disclosure, the one or more image datasets can include any number of digital images, where each dataset is encoded according to a different steganography algorithm. According to yet another exemplary embodiment, the one or more image datasets can include two or more digital images encoded according to the same or different steganography algorithms and at different embedding rates.

Figure 9:
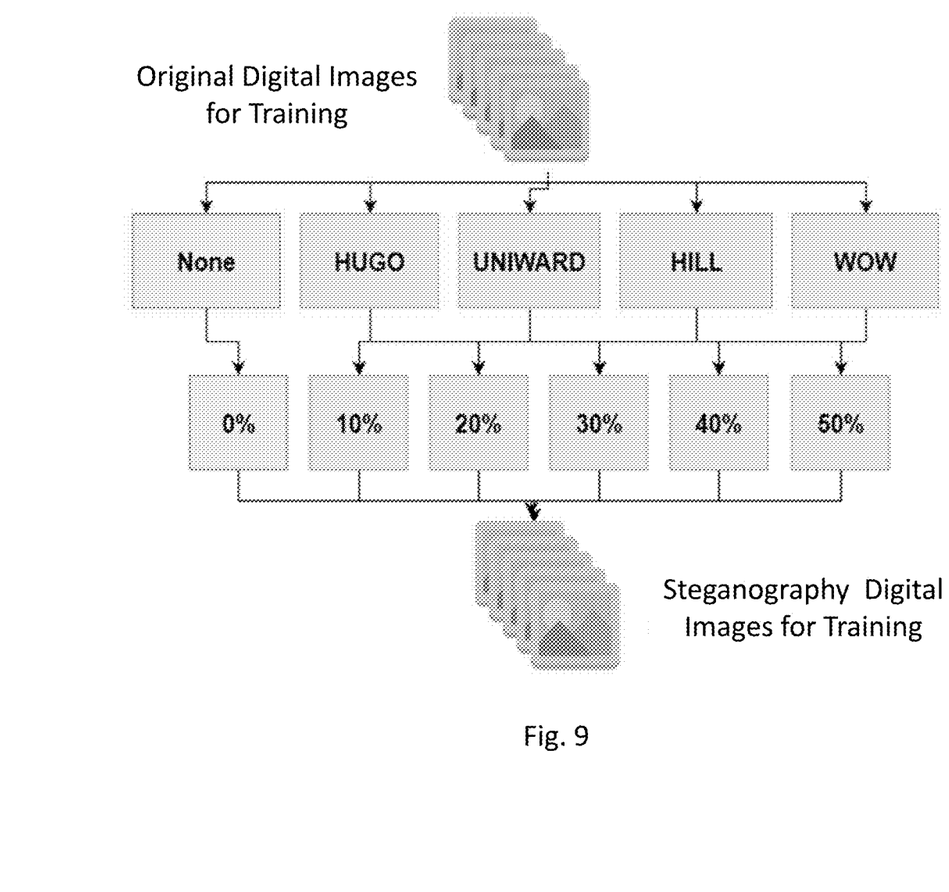
FIG. 9 illustrates a flow diagram of generating image data for training the ensemble classifier in accordance with an exemplary embodiment of the present disclosure.

FIG. 9 illustrates a flow diagram of generating image data for training the ensemble classifier in accordance with an exemplary embodiment of the present disclosure.

As shown in FIG. 9, a base image dataset of a plurality of digital images is used to create the reference image dataset and the other image datasets encoded according to one of a plurality of steganography algorithms. The base image dataset can include a plurality of digital images being different in one or more of an image format, image content, image size, and color space. The digital images in the base image dataset also serve as reference images in that they do not include steganography. The base image dataset is input into selected steganography analyzers according to the desired steganography algorithm to be executed. Each image is iteratively input into the selected steganography algorithms at specified embedding rates. For example, each digital image of the base image dataset can be input into a steganography analyzer SA1 executing the HUGO algorithm. Each image of the base image dataset is iteratively input with data embedded at different embedding rates. According to an exemplary embodiment, the selected embedding rates can be any one or more embedding rates selected from 0% to 100%, and in an exemplary embodiment can include rates of 10%, 20%, 30%, 40%, and 50%, where 10% is the most difficult embedded data to detect. By using the exemplary spectrum of embedding rates in the training data, the steganography analyzers are trained to detect embedding rates $\chi$ anywhere within the spectrum range, according to $100\% \geq \chi > 0\%$.

Training the system involves two stages. The first stage trains the steganography analyzers. The second stage trains the ensemble classifier. According to the method of FIG. 8, during the first stage of training, the reference and one or more encoded image datasets are fed iteratively to two or more steganography analyzers SA-1 to SA-n of the at least one processing device 106 for a specified number of respective epochs or presentations of the entire data sets (Step 802). Weights of at least one of one or more nodes and one or more connections between one or more pairs of nodes of the two or more steganography analyzers SA-1 to SA-n are adjusted according to a digital image pair of the iteratively fed reference and encoded image datasets (Step 804). Each digital image pair includes corresponding images from the reference and one or more encoded image datasets that correspond in at least content of the cover image. Each encoded image dataset includes data embedded according to a specified stenography algorithm as executed by one or more of the steganography analyzers SA-1 to SA-n, and at a selected embedding rate x. These weights are frozen (e.g., stored in memory for each steganography analyzer). Then stage 2 of the training is performed by repeating the iterative feeding of images from the digital image datasets and the output probabilities of the steganography analyzers are combined in the ensemble classifier. The ensemble classifiers weights are then frozen (e.g, stored in memory) and the system can then be used for steganography detection.

For each steganography analyzer SA-1 to SA-n, weights associated with the one or more nodes and one or more connections between pairs of nodes are frozen when a specified condition is satisfied (e.g., an acceptable level of confidence that new image data will be properly processed) and/or when a specified number of epochs for training is reached (Step 806). The weights are frozen in each steganography analyzer SA-1 to SA-n. The output of probabilities of the steganography analyzers are combined in the ensemble classifier 400 (Step 808). The reference and encoded image datasets are iteratively fed to the steganography analyzers for a specified number of epochs (Step 810). In training the ensemble classifier, the same sets of image pairs that were used to train the steganography analyzers can be used, and for example, repeated to train the ensemble classifier. The weights of one or more nodes and one or more connections between pairs of nodes are adjusted and combined to train the ensemble classifier 400 according to the computation results of two or more steganography analyzers SA-1 to SA-n, which are configured to execute different steganography algorithms (Step 812). In freezing the weights of the steganography analyzers and adjusting the weights of the ensemble classifier, steganography detection according to exemplary embodiments of the present disclosure can be fine-tuned and frozen, which results in increased sensitivity and accuracy over prior ensemble techniques in detecting steganography in a digital image.

The computer program code for performing the specialized functions described herein can be stored on a non-transitory computer-readable medium, such as the memory devices for the steganography detection device 101, which may be memory semiconductors (e.g., DRAMs, etc.) or other non-transitory means for providing software to the steganography detection device 101. The computer programs (e.g., computer control logic) or software may be stored in a memory device 110. The computer programs may also be received via a communications interface. Such computer programs, when executed, may enable the steganography detection device 101 to implement the present methods and exemplary embodiments discussed herein. Accordingly, such computer programs may represent controllers of the steganography detection device 101. Where the present disclosure is implemented using software, the software may be stored in a computer program product or non-transitory computer readable medium and loaded into the steganography detection device 101 using a removable storage drive, an interface, a hard disk drive, or communications interface, where applicable.

The processing device 106 of the steganography detection device 101 can include one or more modules or engines configured to perform the functions of the exemplary embodiments described herein. Each of the modules or engines may be implemented using hardware and, in some instances, may also utilize software, such as corresponding to program code and/or programs stored in memory. In such instances, program code may be interpreted or compiled by the respective processors (e.g., by a compiling module or engine) prior to execution. For example, the program code may be source code written in a programming language that is translated into a lower level language, such as assembly language or machine code, for execution by the one or more processors and/or any additional hardware components. The process of compiling may include the use of lexical analysis, preprocessing, parsing, semantic analysis, syntax-directed translation, code generation, code optimization, and any other techniques that may be suitable for translation of program code into a lower level language suitable for controlling the steganography detection device 101 to perform the functions disclosed herein. It will be apparent to persons having skill in the relevant art that such processes result in the steganography detection device 101 being a specially configured computing device uniquely programmed to perform the functions described above.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A system for detecting embedded data in one or more digital images, the system comprising:
a receiving device configured to receive a digital image;
at least one processing device configured to:
feed the digital image to two or more steganography analyzers of the at least one processing device, the two or more steganography analyzers being configured to execute different steganography algorithms;
extract, in each of the two or more steganography detectors, one or more features from the digital image;
analyze, in each steganography analyzer, the one or more extracted features according to the steganography algorithm being executed, the analysis generating a data value indicating a probability that the one or more extracted features is encoded with steganography according to the executed steganography algorithm;
feed the data values generated by each steganography analyzer to an ensemble classifier of the at least one processing device, the ensemble classifier including a plurality of nodes and node connections based on a combination of one or more nodes and node connections between pairs of nodes of the two or more steganography analyzers;
analyze, via the ensemble classifier, the data values of each steganography analyzer; and
generate, via the ensemble classifier and for each digital image associated with the probability values, an output indicating the probability that the subject image includes steganography according to any of the different steganography algorithms.

2. The system of claim 1 wherein the two or more steganography analyzers includes at least four steganography analyzers, each executing a different steganography algorithm.

3. The system of claim 2, wherein the different steganography algorithms executed by the at least four steganography analyzers include a Highly Undetectable Steganography (HUGO) algorithm, a steganography algorithm utilizing a universal distortion function (S-UNIWARD), steganography algorithm based on a hill cipher technique (HILL), and a steganography algorithm based on wavelet obtained weights (WOW).

4. The system of claim 3, wherein one or more of the steganography analyzers is configured to execute one of the different steganography algorithms according to one of a plurality of embedding rates.

5. The system of claim 4, wherein the plurality of embedding rates falls within a spectrum ($\chi$) of embedding rates between $100\% \geq \chi > 0\%$.

6. The system of claim 1, wherein the at least one processing device is encoded with a neural network architecture which includes an analysis neural network for each of the steganography analyzers and an ensemble neural network for the ensemble classifier.

7. The system of claim 6, wherein each of the steganography analyzers comprises:
a feature extractor configured to extract the one or more features from the subject digital images;
a feature analyzer configured to identify one or more components from the extracted one or more features, and
the analysis neural network is configured to analyze the one or more components according to the executed steganography algorithm to generate a first data value indicating the probability that the subject image includes steganography according to the steganography algorithm.

8. The system of claim 6 wherein the ensemble classifier is connected to receive the first data value generated by each steganography analyzer.

9. The system of claim 8, wherein:
the ensemble neural network includes an input layer connected to receive, in parallel, the first data values generated by each of the two or more steganography analyzers, a concatenation layer which is connected to sequentially link the first data values received in parallel at the input layer, and a plurality of intermediate layers include a plurality of nodes with weights based on combined weights and properties of one or more nodes and/or node connections in the two or more steganography analyzers, the first data values of the two or more steganography analyzers being ensembled together in the ensemble neural network.

10. The system of claim 8, wherein the node weights in the two or more steganography analyzers are frozen.

11. A method of training a system for detecting data embedded in a digital image, wherein the system includes a receiving device and at least one processing device, the method comprising:
receiving via the receiving device, a plurality of digital image datasets including a first digital image dataset and a second digital image dataset, the first digital image dataset including a plurality of reference digital images that are free of steganography and the second digital image dataset including steganography digital images based on the plurality of reference digital images, each steganography digital image being encoded according to one of a plurality of steganography algorithms;
iteratively feeding pairs of images where each pair consists of one image from the first digital image dataset and one image from the second digital image datasets to two or more steganography analyzers of the at least one processing device;
adjusting, in each steganography analyzer, weights of at least one of one or more nodes and one or more connections between one or more pairs of nodes according to image pairs of the plurality of images, each image pair including a reference image and a steganography image based on the reference image;
freezing the weights of each steganography analyzer;
iteratively feeding pairs of images where each pair consists of one image from the first digital image dataset and one image from the second digital image datasets to two or more steganography analyzers of the at least one processing device;
combining, in the ensemble classifier, the output probabilities of each steganography analyzer; and
adjusting, in the ensemble classifier, a second set of weights of at least one of one or more nodes and one or more connections between one or more pairs of nodes according to the errors generated by the ensemble classifier for each iteration of pairs of images.

12. The method according to claim 11, comprising:
encoding the plurality of reference images according to two or more steganography algorithms.

13. The method according to claim 12, wherein for each steganography algorithm, encoding the plurality of reference images at a plurality of embedding rates.

14. The method according to claim 13, wherein the plurality of embedding rates includes one or more of the rates of 10%, 20%, 30%, 40%, 50%.

15. The method according to claim 11, comprising:
freezing, in each steganography analyzer, the adjusted weights associated with the one or more nodes and one or more connections between pairs of nodes when the specified number of first epochs is reached.

16. A method for detecting embedded data in a digital image using a system, which includes a receiving device and at least one processing device having two or more steganography analyzers wherein each steganography analyzer is configured to perform steganography analysis according to a different steganography algorithm from the other one or more of the two or more steganography analyzers, the method comprising:
receiving one or more digital images via the receiving device;
extracting, in each of the two or more steganography analyzers, one or more features from each digital image;
feeding the extracted features to the two or more steganography analyzers of the at least one processing device and analyzing the extracted features by executing in each steganography analyzer the corresponding steganography algorithm;
generating, for each digital image at an output of each steganography analyzer, an output data value indicating a probability that the digital image includes steganography according to the steganography algorithm executed by the steganography analyzer;
feeding the output data value of each steganography analyzer to an ensemble classifier of the at least one processing device, the ensemble classifier including a plurality of nodes and node connections based on a combination of one or more nodes and/or node connections between pairs of nodes of the two or more steganography analyzers;
analyzing, via the ensemble classifier, the output data value from each steganography analyzer; and
generating, via the ensemble classifier, an ensemble output indicating the probability that the digital image includes any steganography of the steganography algorithms executed by the two or more steganography analyzers.

17. The method of claim 16, comprising:
determining weights for each steganography analyzer; and
determining weights for the ensemble classifier.

18. An apparatus for detecting embedded data in one or more digital images, the apparatus comprising:
at least one processing device configured to:
extract one or more features from each digital image;
analyze the one or more extracted features in two steganography analyzers, each steganography analyzer configured to execute a different steganography algorithm;
generate a data value at each steganography analyzer, the data value indicating a probability that the one or more extracted features includes steganography according to the steganography algorithm of the steganography analyzer;
feed each data value to an ensemble classifier, the ensemble classifier including a plurality of nodes and node connections based on a combination of one or more nodes and/or node connections between pairs of nodes of the two or more steganography analyzers; and
generate an ensemble output indicating the probability that the digital image associated with the one or more extracted features includes any steganography according to the steganography algorithms of the steganography analyzers.

19. The apparatus of claim 18, wherein weights are stored in each steganography analyze, and in the ensemble.

* * * * *